(12) United States Patent
Bolshtyansky et al.

(10) Patent No.: US 7,715,092 B2
(45) Date of Patent: May 11, 2010

(54) DYNAMIC RAMAN TILT COMPENSATION

(75) Inventors: Maxim Bolshtyansky, East Windsor, NJ (US); Nicholas King, Lawrenceville, NJ (US)

(73) Assignee: JDS Uniphase Corporation, Milpitas, CA (US)

( * ) Notice: Subject to any disclaimer, the term of this patent is extended or adjusted under 35 U.S.C. 154(b) by 219 days.

(21) Appl. No.: 11/863,905

(22) Filed: Sep. 28, 2007

(65) Prior Publication Data

US 2008/0192333 A1    Aug. 14, 2008

Related U.S. Application Data

(60) Provisional application No. 60/827,957, filed on Oct. 3, 2006.

(51) Int. Cl.
H04B 10/17 (2006.01)
H04B 10/12 (2006.01)

(52) U.S. Cl. ............... 359/334; 359/337.11; 359/337.4

(58) Field of Classification Search ............ 359/337.11, 359/337.4, 334
See application file for complete search history.

(56) References Cited

U.S. PATENT DOCUMENTS

| | | | | |
|---|---|---|---|---|
| 5,818,629 A * | 10/1998 | Kinoshita | .............. | 359/337.11 |
| 6,088,152 A | 7/2000 | Berger et al. | ................. | 359/334 |
| 6,275,313 B1 | 8/2001 | Denkin et al. | .................. | 398/9 |
| 6,341,034 B1 * | 1/2002 | Sun et al. | ............... | 359/341.41 |
| 6,421,169 B1 * | 7/2002 | Bonnedal et al. | ......... | 359/337.1 |
| 6,441,950 B1 * | 8/2002 | Chen et al. | .................. | 359/334 |
| 6,476,961 B1 | 11/2002 | Ye et al. | ................ | 359/341.43 |
| 6,535,330 B1 | 3/2003 | Lelic et al. | ............. | 359/337.13 |
| 6,542,287 B1 | 4/2003 | Ye et al. | ..................... | 359/334 |
| 6,678,088 B1 | 1/2004 | Stummer et al. | ....... | 359/341.41 |
| 6,690,505 B1 | 2/2004 | Ye | .............................. | 359/337 |
| 6,697,187 B2 | 2/2004 | Seydnejad et al. | .......... | 359/334 |
| 6,785,042 B1 | 8/2004 | Onaka et al. | ................. | 359/334 |
| 6,943,937 B2 | 9/2005 | Lelik et al. | ............. | 359/337.11 |
| 6,963,681 B2 | 11/2005 | Mao et al. | ...................... | 385/27 |
| 6,975,449 B1 | 12/2005 | Mok et al. | ............. | 359/341.41 |
| 6,985,284 B2 | 1/2006 | Denkin et al. | ................ | 359/334 |
| 7,038,841 B2 | 5/2006 | Chang et al. | ................. | 359/334 |
| 7,038,843 B2 * | 5/2006 | Denkin et al. | .......... | 359/337.11 |
| 7,064,887 B2 | 6/2006 | Mongardian et al. | ........ | 359/334 |
| 7,443,576 B2 * | 10/2008 | Eiselt | ...................... | 359/337.1 |
| 2003/0021009 A1 * | 1/2003 | MacCormack et al. | ...... | 359/337 |
| 2004/0197105 A1 * | 10/2004 | Khatana et al. | ............. | 398/173 |
| 2004/0240042 A1 * | 12/2004 | Charlet et al. | ................ | 359/337 |
| 2004/0252366 A1 * | 12/2004 | Monnard | ..................... | 359/337 |

FOREIGN PATENT DOCUMENTS

EP        1 686 710 A        8/2006

* cited by examiner

*Primary Examiner*—Eric Bolda
(74) *Attorney, Agent, or Firm*—Matthew A. Pequignot; Pequignot + Myers LLC (57) ABSTRACT

Raman tilt is induced by the propagation of optical signals in optical communication fibers during and after transient events. Certain characteristics of the light are monitored at each amplification node and Raman tilt correction is achieved by spectral tilt control optics. The light is monitored either as total power, and/or the power of light after passing through one or more optical filters. In the case of EDFA (Erbium Doped Fiber Amplifier) the correction is performed by adjusting stage gains and VOA loss distribution within the amplifier. The light detection is relatively fast, whereby the tilt is compensated by fast controlled VOA and pump power adjustment during a transient event.

20 Claims, 8 Drawing Sheets

Filter transmission functions

DYNAMIC RAMAN TILT COMPENSATION

CROSS-REFERENCE TO RELATED APPLICATIONS

The present invention claims priority from U.S. Patent Application No. 60/827,957 filed Oct. 3, 2006, which is incorporated herein by reference for all purposes.

TECHNICAL FIELD

The present invention relates to the detection and compensation of dynamic tilt created in optical fiber due to the Raman effect during and after a transient event i.e. when the channel load is variable in time, and in particular to Raman tilt compensation performed by an EDFA.

BACKGROUND OF THE INVENTION

In a wavelength division multiplexing (WDM) transmission system, various different information channels are encoded, i.e. modulated, into light at different frequencies, i.e. different wavelength channels. Typically continuous wavelength light is generated at a particular frequency, modulated with some kind of modulator, which encodes the information into the light, and then combined with other optical channels at different light frequencies using a multiplexer. The combined light is transmitted through an optical fiber and/or an optical fiber network to a receiver end of the optical fiber. At the receiver end, the signal is separated, i.e. demultiplexed, back into the individual optical channels through a de-multiplexer, whereby each optical channel can be detected by some optical detector, e.g. photo-diode, and the information can reconstructed on a per-channel basis.

While propagating through the optical fiber, light tends to loose intensity due to the losses related to the physics of how the light interacts with the optical fiber. Yet some minimal level of optical channel intensity is required at the receiver end in order to decode information encoded on the optical channel. In order to boost the optical signal while propagating in the optical fiber, optical amplifiers are deployed at multiple locations, known as nodes, along the transmission link. The amplifiers extend the maximum possible length of the link, e.g. from a few hundred kilometers to several thousand kilometers, whereby after each fiber span, the optical signal is amplified to power levels close to the original levels at the transmitter. During the amplification process some amount of noise is introduced which prevents links from being of unlimited length.

Figure 1:
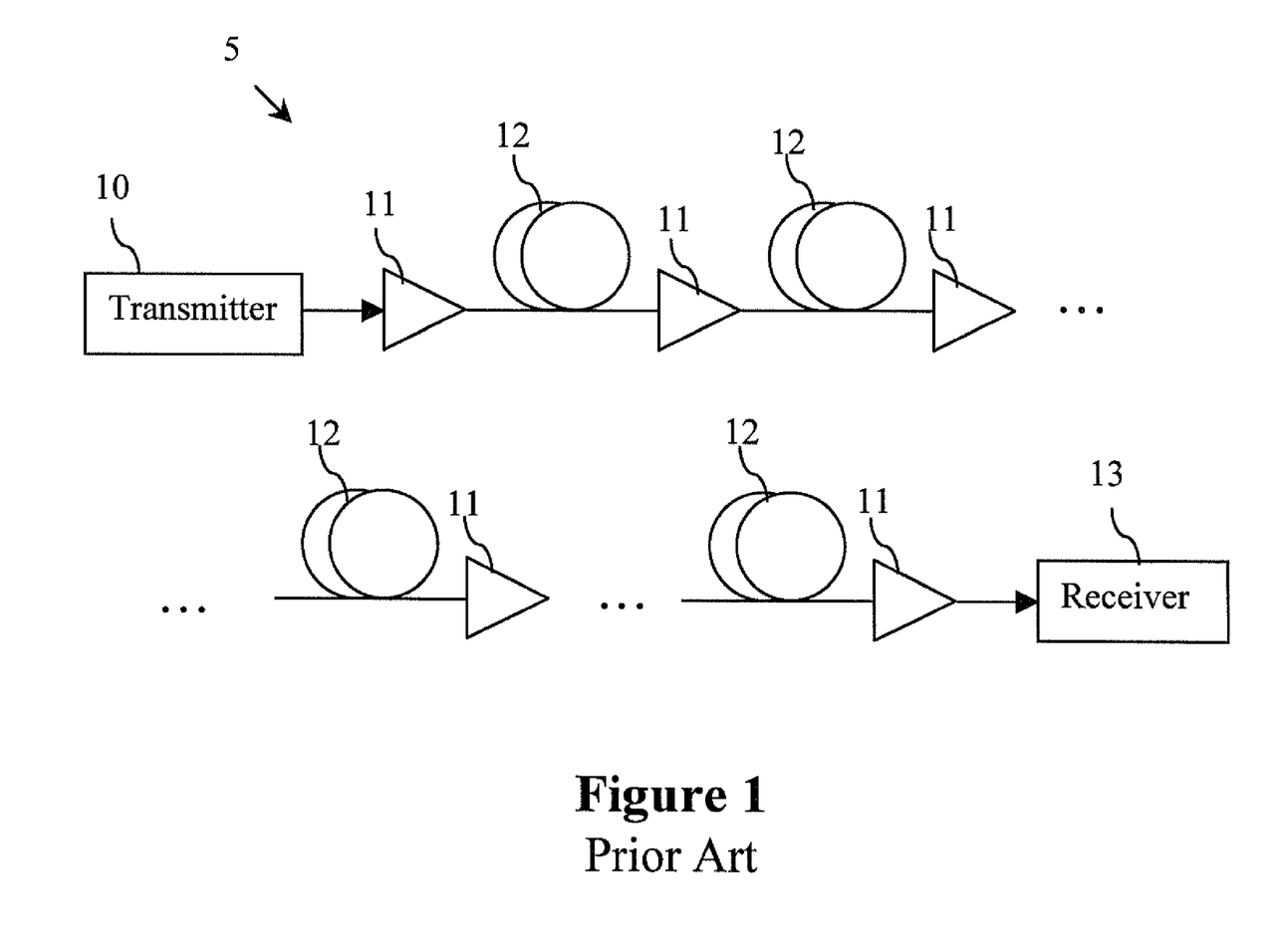
FIG. 1, illustrates a conventional point-to-point optical communication link.

The amplifiers at amplification nodes should similarly amplify all optical wavelength channels, which are propagated in the link; otherwise, some channels will not have sufficient intensity and signal-to-noise level at the receiver end, resulting in information being lost. A typical communication link 5, schematically illustrated in FIG. 1, includes a transmitter 10 for generating the optical wavelength channels and multiplexing the channels into a single WDM signal, and a plurality of spaced apart optical amplifiers 11, e.g. Erbium Doped Fiber Amplifiers (EDFAs) separated by fiber spans 13. The number of spans 12 and amplifiers 11 will vary from link to link. The WDM signal is demultiplexed back into wavelength channels and then separately detected at the end of the link 5 at a receiver 13.

Optical fibers in communication links introduce optical dispersion, which has undesirable effects on the performance of the link. Typically, Dispersion Compensation Modules (DCMs) are inserted at amplifier nodes of the link, between stages of EDFAs, in order to compensate the link dispersion and thus to improve the link performance. Moreover, additional optical components, such as add/drops, cross-connects and DGEs (Dynamic Gain Equalizers) may also be inserted in the middle of an amplifier, requiring multiple controlled gain stages in the amplifier to compensate for the loss due to the additional optical components.

Figure 2:
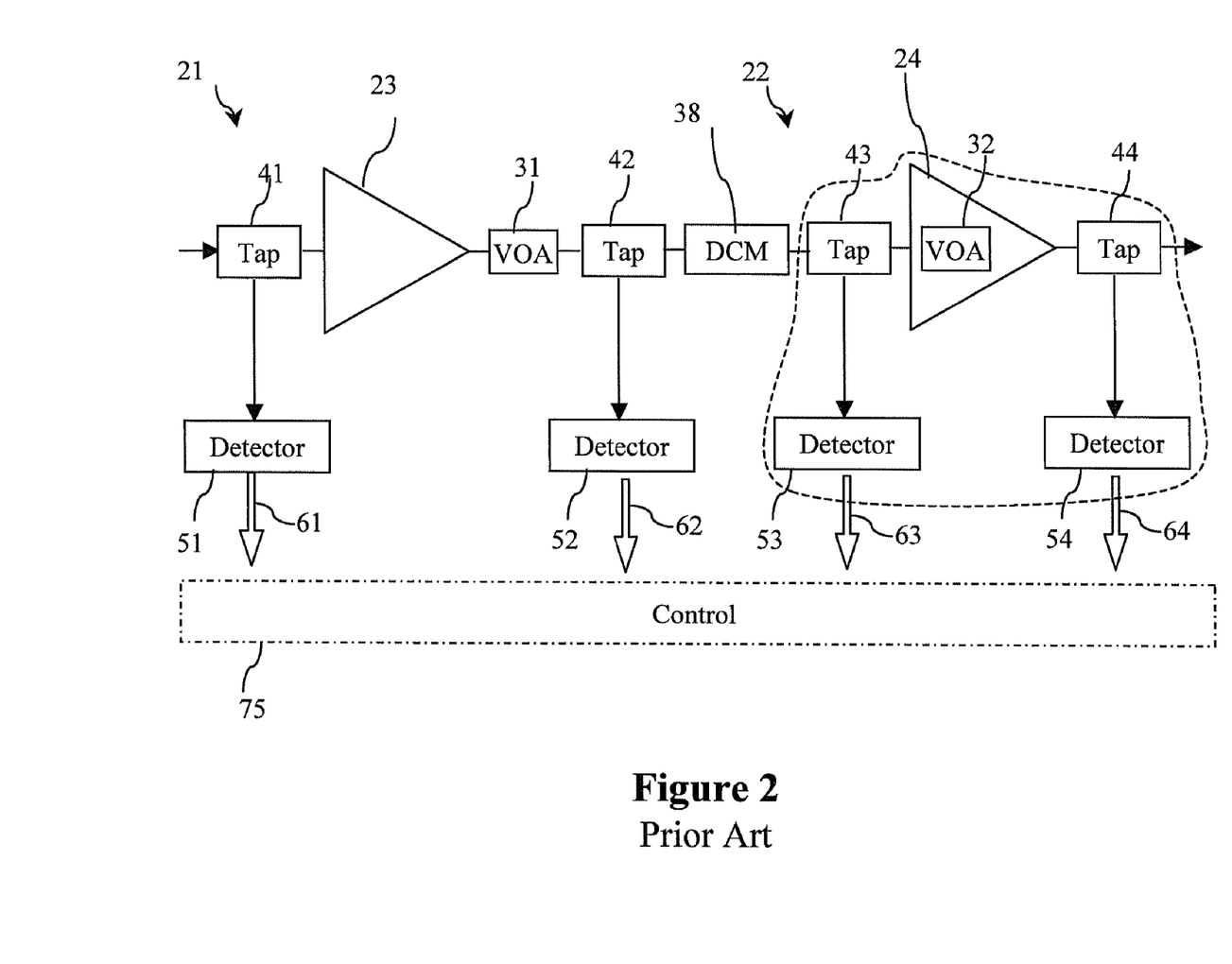
FIG. 2 illustrates a conventional optical amplifier with mid-stage access.

A multi-stage EDFA 20, illustrated in FIG. 2, comprises first and second controlled gain stages 21 and 22, and first and second optical amplification sub-stages 23 and 24. In the first control stage 21*a* first variable optical attenuator (VOA) 31 is situated after the first optical amplification stage 31, and a second VOA 32 is embedded within the second optical amplification stage 32. Accordingly, the second VOA 32 is located between EDF (Erbium Doped Fiber) coils that produce amplification. A DCM 38 or other optical device is positioned in between the first and second controlled gain stages 21 and 22.

Portions of the light are deviated from the main optical link by taps 41, 42, 43 and 44 into photo-detectors 51, 52, 53 and 54, respectively, for measuring the light's power before and after the first and second optical amplification sub-stages 23 and 24. The information needed for gain control is passed by electrical signals 61, 62, 63 and 64 from detectors 51, 52, 53 and 54, respectively, into a master controller 75. The detectors 51, 52, 53 and 54 are calibrated in such a way that an accurate representation of the power at various parts of the amplifier gain stages 21 and 22 can be determined by the measurements performed thereby.

The amplifiers 11, i.e. the first and second controlled gain stages 23 and 24 can be Raman optical amplifiers, distributed or discrete, or a combination of EDFA and Raman amplifiers. During Raman amplification, pump light is launched into the optical fiber via the first and/or second controlled amplifier stages 23 and 24, and signal amplification occurs in the fiber spans 12. The pump light can be launched either co-propagating with the WDM signal or counter-propagating therewith. The pump light can consist of multiple wavelengths to achieve desired signal amplification characteristics. The internal portions of each amplifier 11, such as dispersion compensation module containing long portions of the fiber can also be pumped for Raman amplification.

One effect of light propagation through the communication fiber is inter-channel Raman interaction, which manifests as tilt in the transmitted spectra, i.e. the wavelength channels with shorter wavelengths have lower power than the wavelength channels with longer wavelengths, after propagation through the fiber. The spectral tilt depends on both total optical power and wavelength channel distribution. Conventional optical amplifiers 11 have tried to compensate for the Raman spectral tilt effect by introducing a gain tilt of the opposite sign.

The communication links described above are so called point-to-point links, in which all information is transmitted from one point only to another point. However, in a realistic transmission system there are multiple points that need to transmit information and multiple points that need to receive information. Different optical channels, which originated at the same transmitter 10, are required to go to different receivers situated at different locations. Instead of simple point-to-point optical communication links, more complex, network-type or web-type topology is used, in which optical channels are switched from one path to another path at multiple network nodes, which are referred as cross-connect nodes and add/drop nodes.

The process of switching the channels at multiple network nodes results in the number of channels passing through each optical amplifiers 11 to vary with time. In order to keep the channel power at the output of each amplifier 11 constant over time, regardless of the number of wavelength channels passing through, the pump power of the first and second controlled amplifier stages 23 and 24 needs to be adjusted to compensate for the changes in the wavelength channel load, which is called "transient control". Amplifiers 11 with transient control are called either transient controlled amplifiers or gain controlled amplifier, i.e. the control is achieved by monitoring and keeping the average gain of the amplifier constant. Failing to do transient control results in the signal power significantly varying at the receiver 13 over time and over wavelength, which could result in some of the transmitted information being lost.

During a transient event, conventional transient controlled amplifiers adjust the pump power in the first and second controlled amplifier stages 23 and 24 to compensate for variations in input signal power by keeping the average amplifier gain constant; however, conventional transient controlled amplifiers do not compensate for Raman tilt variations with time when channel loading and total power is changing.

While some Raman tilt compensation techniques have been developed to compensate for different steady state loads, most require measurement of the per channel power by an optical channel monitor (OCM) or other similar device. Due to the relatively long time for OCM devices to perform measurements, accurate tilt compensation is not possible during fast transient events.

An object of the present invention is to overcome the shortcomings of the prior art by providing an optical amplifier which compensates for Raman tilt during and after a transient event.

SUMMARY OF THE INVENTION

Accordingly, the present invention relates to a method for compensating for Raman tilt in an optical signal, defined by a center wavelength, transmitted in an optical fiber link, which includes an optical amplifier, comprising the steps of:
 a) tapping off a portion of the optical signal;
 b) determining a measure of optical power from the tapped off portion;
 c) determining the Raman tilt from the measure of optical power; and
 d) adjusting gain provided by the optical amplifier to compensate for the Raman tilt.

Another aspect of the present invention relates to an optical amplifier device for compensating for Raman tilt in an optical signal, defined by a center wavelength, transmitted in an optical fiber link, which includes an optical amplifier, comprising:
 a tap for separating a portion of the optical signal;
 a photo-detector for determining a measure of optical power from the separated portion;
 a controller for determining the Raman tilt based on the measure of optical power; and
 an adjustable optical amplifier controlled by the controller for amplifying the optical signals to compensate for the Raman tilt.

BRIEF DESCRIPTION OF THE DRAWINGS

The invention will be described in greater detail with reference to the accompanying drawings which represent preferred embodiments thereof, wherein.

DETAILED DESCRIPTION

Figure 3:
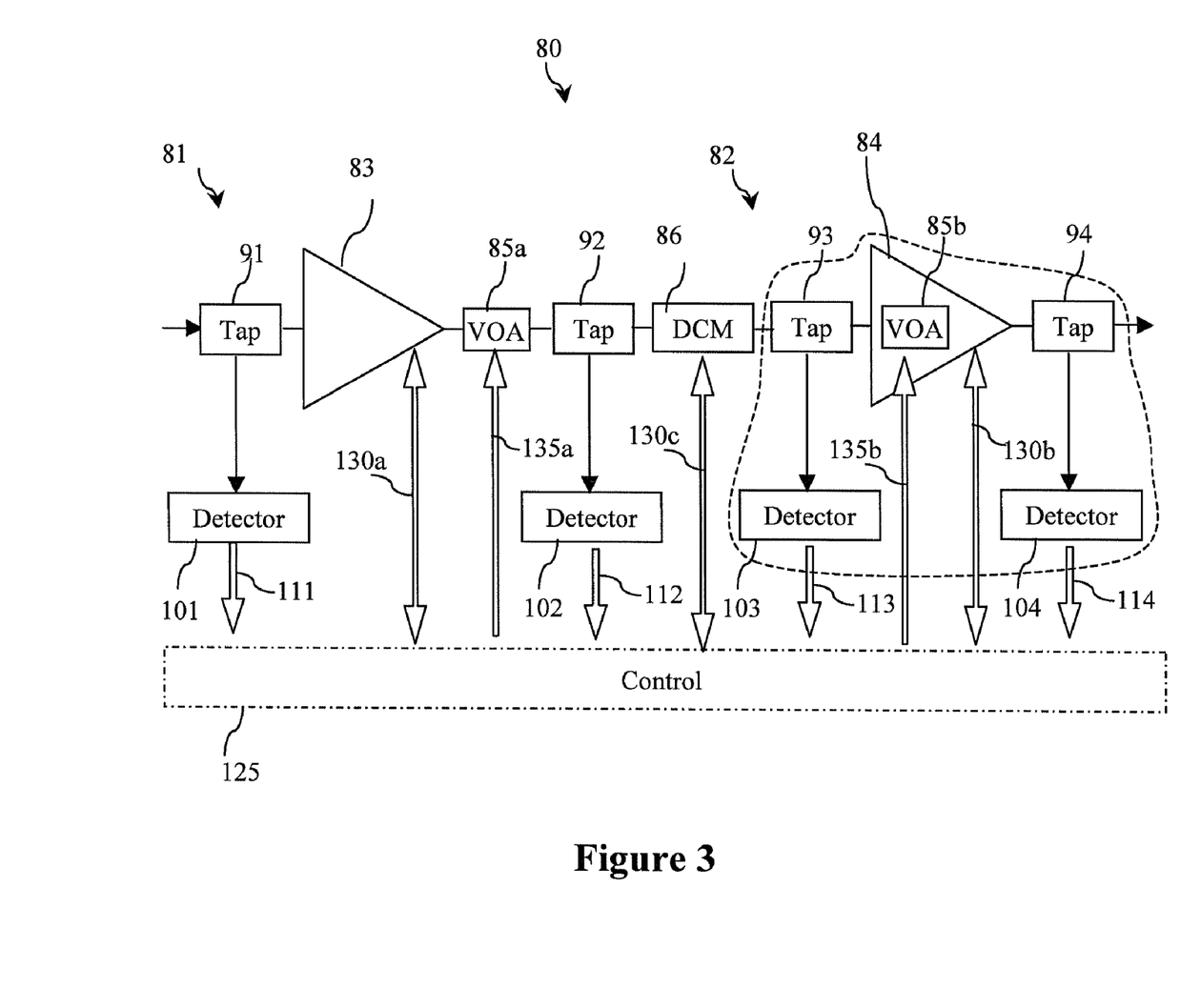
FIG. 3 illustrates a optical amplifier in accordance with the present invention with mid-stage access.

With reference to FIG. 3, a first embodiment of the present invention is based on a two stage amplifier 80 comprising first and second controlled gain stages 81 and 82, and first and second optical amplification sub-stages 83 and 84, as in the conventional amplifier 11. In the first control stage 81a first variable optical attenuator (VOA) 85a is situated after the first optical amplification stage 81, and a second VOA 85b is embedded within the second optical amplification stage 82. Accordingly, the second VOA 82 is located between EDF (Erbium Doped Fiber) coils that produce amplification. A dispersion compensation module DCM 86 or other optical device is positioned in between the first and second controlled gain stages 81 and 82, as hereinbefore discussed.

Portions of the light are deviated from the main optical link by taps 91, 92, 93 and 94 into photo-detectors 101, 102, 103 and 104, respectively, for measuring the light's power before and after the first and second optical amplification sub-stages 83 and 84. The information needed for gain control is passed by electrical signals 111, 112, 113 and 114 from detectors 101, 102, 103 and 104, respectively, into a master controller 125. The detectors 101, 102, 103 and 104 are calibrated in such a way that an accurate representation of the power at various parts of the amplifier gain stages 81 and 82 can be determined by the measurements performed thereby.

The first and second controlled gain stages 83 and 84 can be Raman optical amplifiers, distributed or discrete, or a combination of EDFA and Raman amplifiers. During Raman amplification, pump light is launched into the optical fiber via the first and/or second controlled amplifier stages 83 and 84, and signal amplification occurs in the fiber spans 12. The pump light can be launched either co-propagating with the WDM signal or counter-propagating therewith. The pump light can consist of multiple wavelengths to achieve desired signal amplification characteristics. The internal portions of each amplifier 80, such as the dispersion compensation module 86 containing long portions of the fiber can also be pumped for Raman amplification. Alternatively, the first and second controlled gain stages 83 and 84 are EDFA's and the DCM 86 is replaced by a Raman optical amplifier (ROA).

In a steady state situation, i.e. when the input channel load is constant, the first and second controlled amplifier stages 83 and 84, (and the ROA 86, if provided) of the amplifier 80 are set into a particular gain level via pump control through communication lines 130a, 130b and 130c, respectively, and by control of the first and second VOAs 85a and 85b via communication lines 135a and 135b, respectively. The gain of each amplifier stage is obtained from the powers measured by detectors 101, 102, 103 and 104.

A typical goal of the transient control of the amplifier 80 is to hold the average signal gain constant, by adjusting the pump powers in such a way that the measured gain of each stage 81 and 82 (and 86, if an ROA) is also constant, which is done through some kind of feed-back control by controller 125. Some other additional types of control, such as feed-forward control, can be employed in combination with feed-back control.

Figure 4:
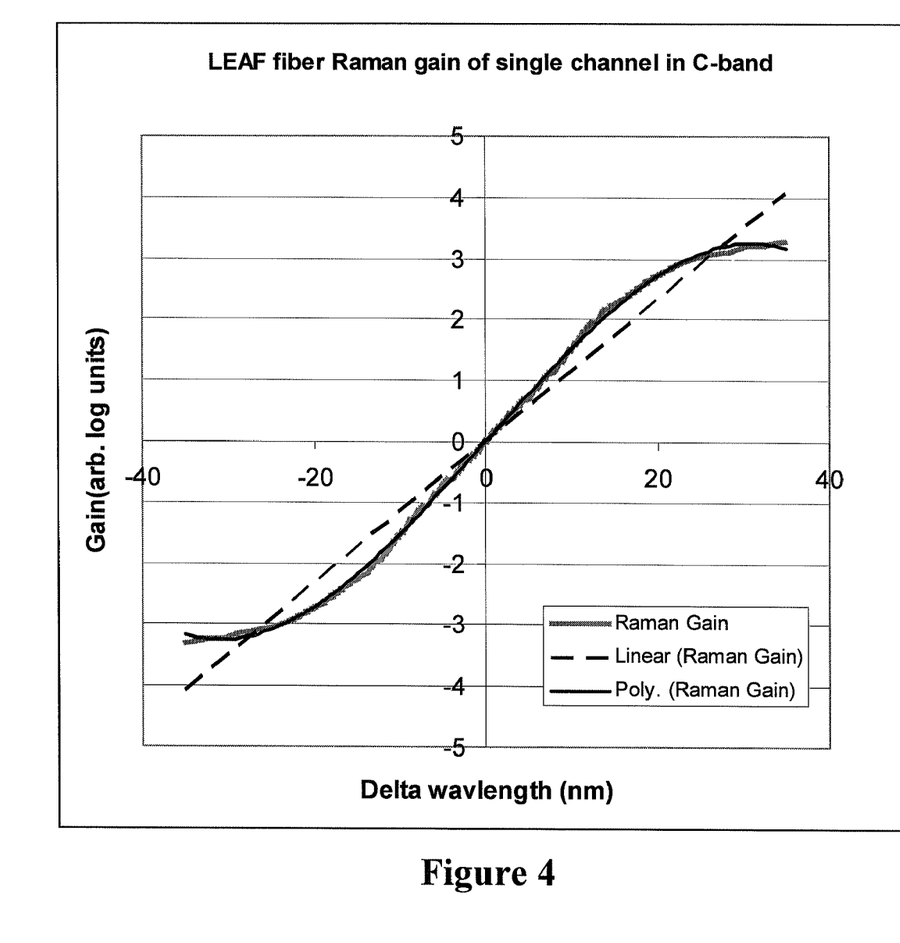
FIG. 4 illustrates a Raman gain curve created by a single channel in C-band.

Understanding how tilt is formed is important in order to understand what parameters of the signal need to be measured for the fast compensation of Raman tilt. When multiple wavelength channels propagate through the communication fiber, each channel creates wavelength dependent gain or loss to other channels. An example of the gain shape created by a single channel is shown in FIG. 4. Each wavelength channel amplifies the channels with longer wavelengths and de-amplifies or is amplified itself by the channels with shorter wavelengths, resulting in the channel spectrum being tilted after propagation through the fiber.

FIG. 4 illustrates that the Raman gain $G_R$ can be approximated either by a linear function, or by a polynomial, e.g. cubic, function. The cubic function provides an excellent approximation of the Raman gain when the wavelengths differ by less than or about 35 nm, which is the width of C-band. The approximation of the Raman gain by the cubic approximation is as follows:

$$G_R(\lambda) = a \cdot \lambda + b \cdot \lambda^3 \quad (1)$$

The total gain G of all channels acting upon themselves is:

$$G(\lambda) = \sum_{\lambda'} P(\lambda') \cdot G_R(\lambda - \lambda') \quad (2)$$

$$= a \sum_{\lambda'} P(\lambda') \cdot (\lambda - \lambda') + b \sum_{\lambda'} P(\lambda') \cdot (\lambda - \lambda')^3 =$$

$$= a \sum_{\lambda'} P(\lambda') \cdot ((\lambda - \lambda_0) - (\lambda' - \lambda_0)) + b \sum_{\lambda'} P(\lambda') \cdot$$

$$((\lambda - \lambda_0) - (\lambda' - \lambda_0))^3 =$$

$$= -a \cdot \sum_{\lambda'} P(\lambda') - b \sum_{\lambda'} P(\lambda') \cdot (\lambda' - \lambda_0)^3 - 3b(\lambda - \lambda_0)^2$$

$$\sum_{\lambda'} P(\lambda') \cdot (\lambda' - \lambda_0) + +(\lambda - \lambda_0) \cdot$$

$$\left[ a \sum_{\lambda'} P(\lambda') + 3b \sum_{\lambda'} P(\lambda') \cdot (\lambda' - \lambda_0)^2 \right]$$

$\lambda_0$ is an arbitrary wavelength that is introduced for convenience; which can be put into the center of the band. The linear tilt is defined by the last term $$(\lambda - \lambda_0) \cdot \left[ a \sum_{\lambda'} P(\lambda') + 3b \sum_{\lambda'} P(\lambda') \cdot (\lambda' - \lambda_0)^2 \right]$$

which includes multiplication by the linear term $(\lambda - \lambda_0)$. The rest of the terms do not have linear dependence on $(\lambda - \lambda_0)$. The value of the linear tilt T is proportional to the expression in the square brackets:

$$T = a \sum_{\lambda'} P(\lambda') + 3b \sum_{\lambda'} P(\lambda') \cdot (\lambda' - \lambda_0)^2 \quad (3)$$

$$= a \cdot P_{total} + 3b \cdot P_2$$

$$P_{total} = \sum_{\lambda'} P(\lambda')$$

-continued $$P_2 = \sum_{\lambda'} P(\lambda') \cdot (\lambda' - \lambda_0)^2$$

Thus the Raman tilt is the sum of two terms, the first term is proportional to the total power $P_{total}$ and the second term is proportional to the second moment $P_2$.

Figure 5:
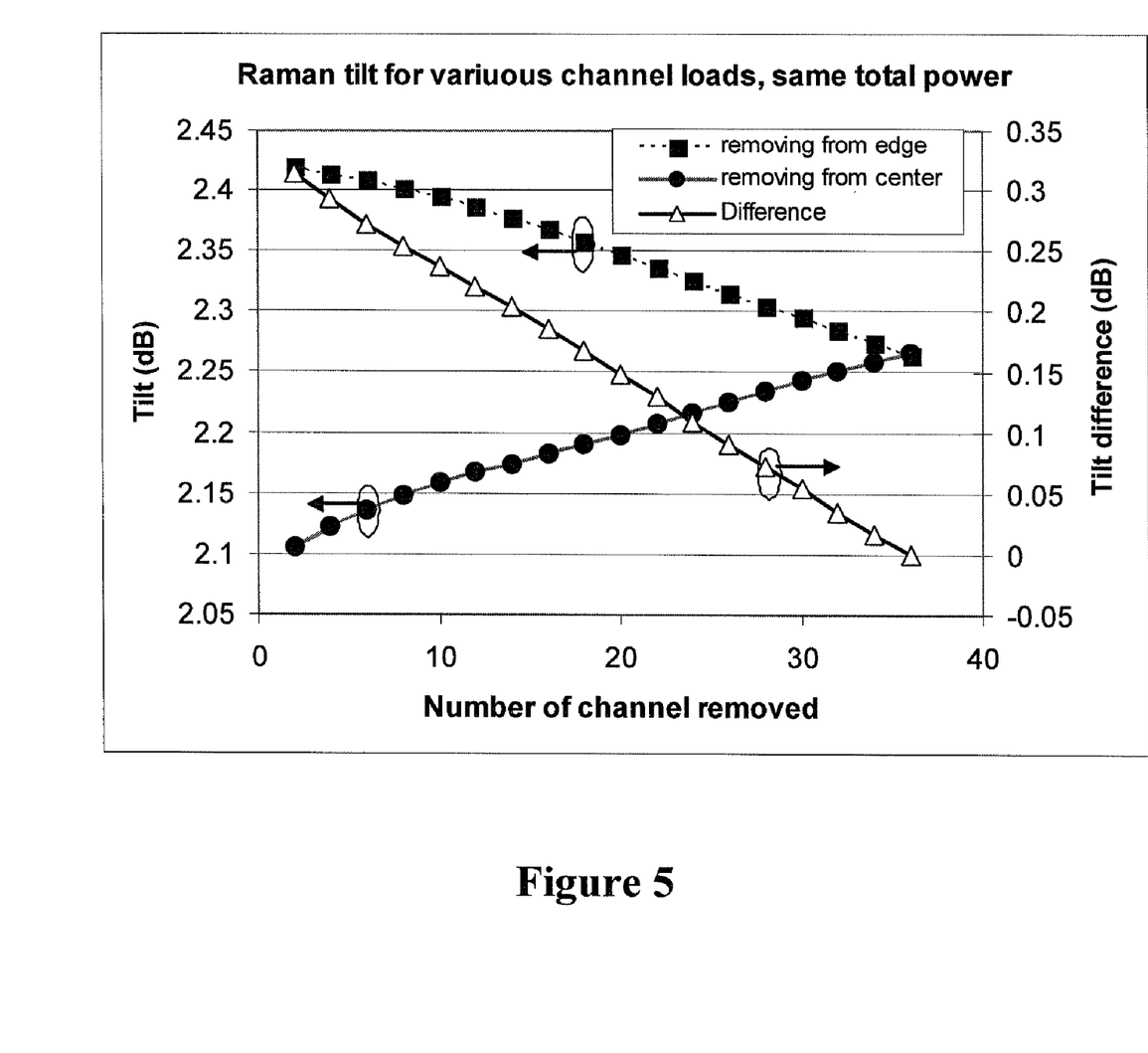
FIG. 5 illustrates a simulation of Raman tilt with different channel loads.

The total power $P_{total}$ term is a numerically larger term than the second moment term $P_2$, whereby the total power can be used for a rough approximation of the Raman induced tilt. FIG. 5 illustrates the accuracy of such approximation. In the illustrated simulations the total power at the input of the optical fiber is the same, but the channel load, i.e. the number of channels, has changed. Namely, the channels were gradually removed starting from the edges of the spectrum in one case, and from the center of the spectrum in another case. The channel power is adjusted in order to have total power the same for all cases. Due to the fact that total power is the same in all simulated cases, all differences in the tilt value for FIG. 5 are coming from the terms other than the total power related term, i.e. the second moment term $P_2$.

There are a plurality of means and methods for estimating the required tilt correction. Preferably, the tap 94 and the detector 104 (hereinafter referred to as tap/detector module) shown in FIG. 3, are replaced by one of the tap/detector modules shown in FIG. 6a to 6c. However, any tap/detector module in the amplifier 80 can be substituted and used for the tilt compensation estimation. Some additional calculations may be needed if other output tap/detector modules are used for tilt compensation estimation. The tap/detector module, illustrated in FIG. 6a, includes the tap 94 and the detector 104, i.e. identical to any tap/detector module in FIG. 3, and relies on the total power value only.

Figures 6A, 6B:
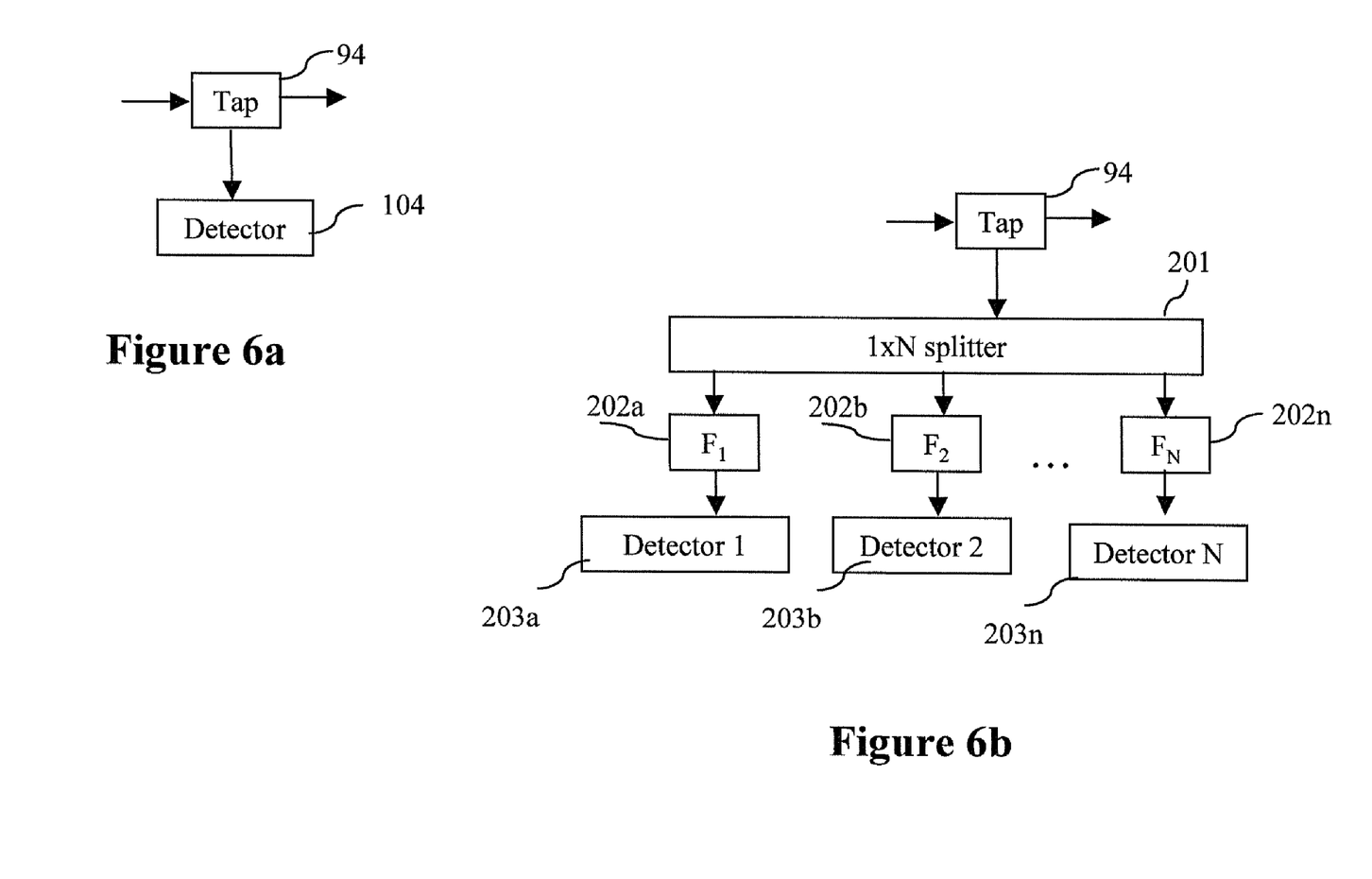
FIGS. 6a to 6c illustrate examples of signal measurement systems for the estimation of the necessary Raman tilt correction.

A general topology of a tap/detector module in accordance with a preferred embodiment of the present invention is shown in FIG. 6b. A portion of the light, deviated by the tap 94, is split into N optical paths by 1×N splitter 201, wherein N is equal to one, two or more. Each optical path has a respective optical filter 202a to 202n, each of which filters some portion of the light, before the light comes to the detectors 203a to 203n. One of the filters may be eliminated to provide the corresponding detector with an optical power measurement proportional to the total optical power of the optical signal.

Figure 6C:
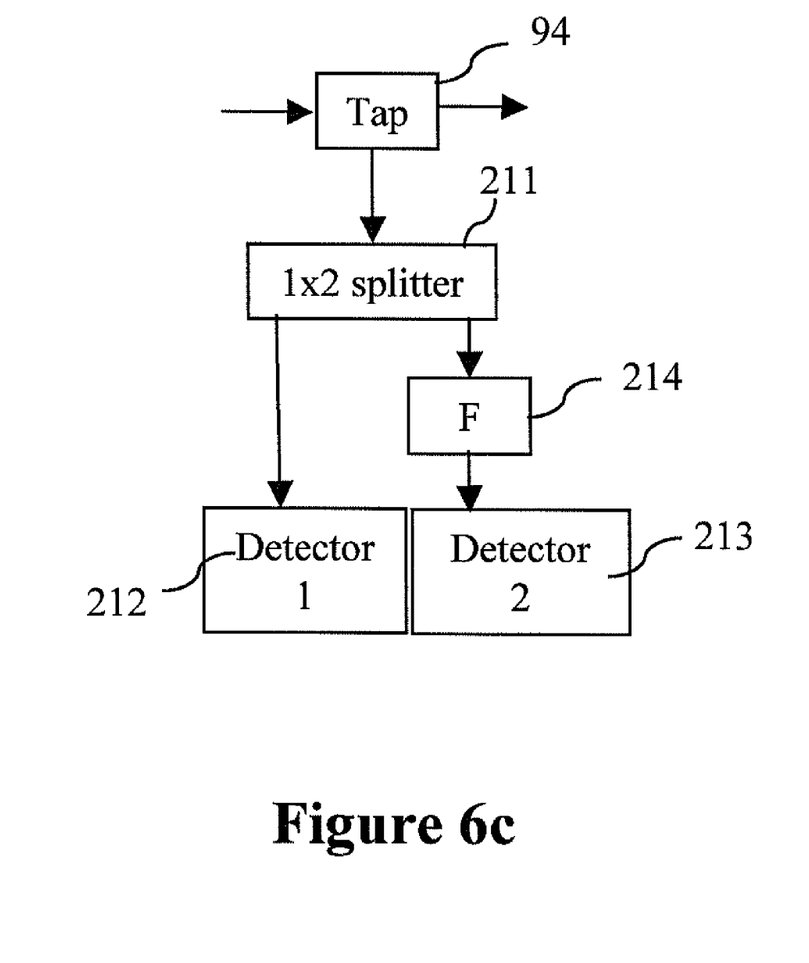

A practical topology, in which both $P_{total}$ and $P_2$ values are estimated by the tap/detector module, is illustrated in FIG. 6c, in which a 1×2 splitter 211 is used to split the portion of the light tapped off by tap 94 into two paths. The total signal power $P_{total}$ is estimated by a first detector 212, while the second moment term $P_2$ is estimated using a second detector 213, which receives the light after the light has been filtered by an optical filter 214.

Figure 7A:
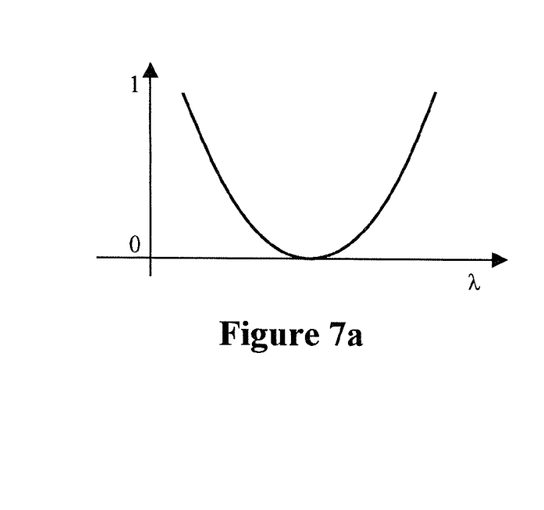
FIGS. 7a to 7d illustrate filter transmission functions used for extraction of spectral information for Raman tilt compensation calculation.
Figure 7B:
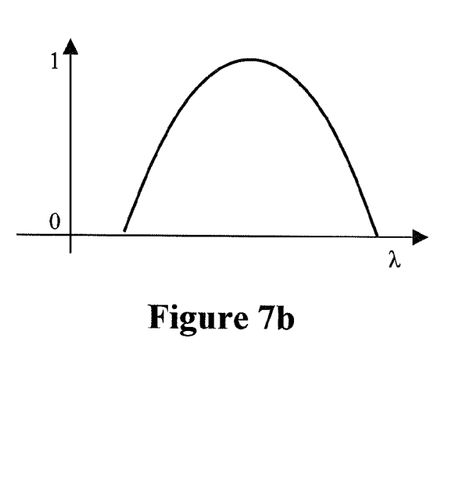

Various possible examples of the transmission function for the filters 202a to 202n and 214 are shown in FIGS. 7a to 7d. FIG. 7a illustrates the transmission function of the filter 214, which enables the detector 213 to measure light power directly proportional to the second moment $P_2$ of equation 3. FIG. 7b illustrates an alternative transmission function for the filter 214, which is the inverse to filter 214 shown in FIG. 7a, but can be used to calculate the value of $P_2$ for use in measurement of the light power by the detector 213.

Generally, the filter 214 blocks all of center wavelength's $\lambda_0$ optical power and the optical power of wavelength's on either side thereof, and gradually decreasingly less amounts of the optical power of the wavelengths on either side of the center wavelength, as the wavelengths get farther away from the center wavelength $\lambda_0$. With reference to FIGS. 7a and 7b, the transmission function of the filter is $T(\lambda)=c_1+c_2\cdot(\lambda-\lambda_0)^2$ in which $c_1$, $c_2$ and $\lambda_0$ are constants based on the filter. When $c_1=0$ and $c_2>0$, the transmission function is parabola shaped, illustrated in FIG. 7a. When $c_1>0$ and $c_2<0$, the transmission function is inverted parabola shaped, illustrated in FIG. 7b.

Figure 7C:
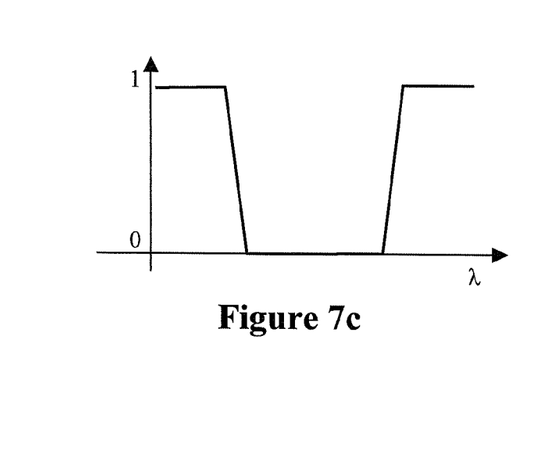
Figure 7D:
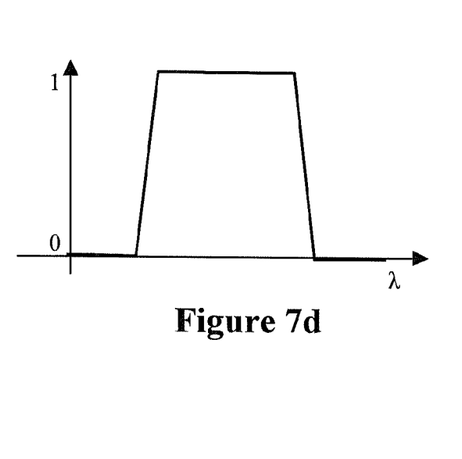

FIGS. 7c and 7d illustrate alternative transmission functions for the filters 202 and 214, which are only linear approximations, e.g. trapezoidal-shaped, of the above transmission functions illustrated in FIGS. 7a and 7b, respectively, whereby the value of $P_2$ obtained with these filters is less precise than the values obtained with the filters detailed above. The possible reason for the use of filters 7c and 7d is the ease of their manufacturing.

Once the values corresponding to $P_{total}$ alone, or corresponding to $P_{total}$ and $P_2$ are obtained, the calculation of tilt T becomes possible with known constants a and b according to the equation 3. The constants a and b can be provided to the amplifier 80 by an external control system of the service provider or alternatively, a set of a and b coefficients can be measured in advance for all possible fibers that are used in optical communication systems and the external system and memorized in the amplifier controller 125. The external system then provides only the type of the fiber for which amplifier controller selects the appropriate a and b coefficients. The coefficients a and b are on the order of a=0.3 dB/(W*nm) and b=0.0001 dB/(W*nm$^3$).

After the tilt value T is calculated, the appropriate correction to the gains of the first and second controlled amplifier stages 83 and 84 (and the ROA 86, if provided) and the first and second VOA's 85a and 85b should be applied from the controller 125 via communication lines 130a, 130b and 130c. Typically the best results in terms of amplifier performance are obtained when all gains and VOA values are modified. But for practical reasons some of the gains and VOA values can be kept constant and others are modified. After the gain and VOA values corrections are calculated, the controller 125 adjusts the gain targets and the loss targets in the EDFA control algorithms. Due to the fact that the Raman tilt change occurs at the same time when the channels are added and dropped, the amplifier 80 reacts on the change of the input power at the same time as it reacts on the command to change VOA values and stage gain values for Raman tilt compensation. The control loop and the reaction time for the VOA's 85a and 85b, should be sufficiently fast, so that by the time the transient adjustments of the pumps in the EDFA's 83 and 84 are done, the VOA adjustment is also finished.

| Tilt T | ΔG1 | ΔG2 | ΔVOA1 | ΔVOA2 |
|---|---|---|---|---|
| Tilt Value 1 | | | | |
| Tilt Value 2 | | | | |
| ... | | | | |
| Tilt Value N | | | | |

Table 1 defines stage gains (ΔG1 and ΔG2) for the first and second controlled amplifier stages 83 and 84, and VOA loss values (ΔVOA1 and ΔVOA2) for the first and second VOAs 84 and 85 for various Raman tilt values T for compensation of the Raman tilt for the preferred embodiment of a two stage amplifier, e.g. EDFA. During the amplifier's design process, Table 1 is filled with the data, which is later stored in the amplifier controller memory 125. During a transient event when the tilt value is calculated, the amplifier control 125 finds the appropriate line in Table 1, and adjusts the stage gains and VOA loss values accordingly. If particular tilt values are not in the table, then the amplifier controller 125 can calculate the adjustments by interpolating values from neighboring lines.

In an alternate embodiment of the present invention, the Raman tilt is compensated by Raman amplifiers present in the system, not by EDFA. Compensation is achieved by adjusting the pump powers in the Raman amplifiers at different pump wavelengths in such a manner that the Raman gain tilt produced by the pump lights changes. A feedback loop can be provided to ensure complete compensation or a table of known Raman tilt and Raman amplifier settings can be accessed by the controller 125. If at the same time EDFAs are present in the system, i.e. a hybrid Raman/EDFA system as in FIG. 3 in which DCM 86 is replaced by a ROA or if a ROA is placed before the first EDFA stage, then EDFA and ROA gain may also need to be adjusted by the controller 125, via communication lines 135a, 135b and 135c to work in combination with the Raman tilt adjustment. In all cases the measurement of the necessary adjustment is obtained by one of the tap/detector modules show in FIG. 6a to 6c, which can be positioned anywhere in the link. Raman amplifiers can adjust tilt relatively fast, whereby the adjustments can be done during a transient event. Again, a table of Raman tilt values and predetermined gain and attenuation settings, as disclosed above, can be utilized by the controller 125 to control any one or more of the amplifier and attenuation stages.

Special tilt compensation devices, which$_{canc}$ have variable tilt in the loss spectrum thereof, can also be deployed in the link. The special device, which are fast enough, also can be used for dynamic tilt compensation to change tilt values during the transient event.

We claim:

1. A method for compensating for Raman tilt in an optical signal, defined by a center wavelength, transmitted in an optical fiber link, which includes an optical amplifier, comprising the steps of:

a) tapping off a portion of the optical signal including a plurality of wavelength channels $\lambda'$, including a first wavelength $\lambda_1$;

b) determining a measure of optical power of the optical signal, from the tapped off portion;

c) determining the Raman tilt from the measure of optical power; and d) adjusting gain provided by the optical amplifier to compensate for the Raman tilt;

wherein step b) includes:

i) separating the tapped off portion into first and one or more second sub-portions;

ii) passing the first sub-portion to a first photo-detector to determine the measure of optical power $P_{tot}$; and iii) passing each of the second sub-portions to an optical filter with a predetermined transmission function based on the optical signal's second moment of power terms $P_2$ forming a filtered second sub-portion; and iv) passing each of the filtered second sub-portions to a second photo-detector to determine a measure proportional to the optical signal's second moment of power terms $P_2$;

wherein $$P_2 = \sum_{\lambda'} P(\lambda') \cdot (\lambda' - \lambda_1)^2;$$

wherein step c) includes determining the Raman tilt based on the equation $T = a \times P_{tot} + 3b \times P_2$, in which a and b are predetermined based on the optical fiber link.

2. The method according to claim 1, wherein the optical filter substantially filters out optical power at the center wavelength, and filters out gradually decreasingly less amounts of optical power at wavelengths on either side of the center wavelength.

3. The method according to claim 2, wherein the predetermined transmission function of the optical filter is parabola shaped, defined by: $T(\lambda) = c_2 \cdot (\lambda - \lambda_0)^2$ in which $c_2$ is predetermined constants based on the filter, and $\lambda_0$ is the center wavelength.

4. The method according to claim 2, wherein the predetermined transmission function is inverted parabola shaped, defined by: $T(\lambda) = c_1 + c_2(\lambda - \lambda_0)^2$ in which $c_1$, $c_2$ and $\lambda_0$ are predetermined constants based on the filter, wherein $c_1$ is > or =0, and $c_2$ is <0 or >0.

5. The method according to claim 1, wherein the optical amplifier includes first and second controlled amplifier stages, and first and second variable optical attenuators;
wherein step d) includes adjusting gain in at least one of the first and second controlled amplifier stages, and adjusting attenuation in at least one of the first and second variable optical attenuators.

6. The method according to claim 5, wherein step d) includes consulting a predetermined table of optical power measurements with corresponding gain and attenuation settings for the first and second controlled amplifier stages, and the first and second variable optical attenuators; and setting the first and second controlled amplifier stages and the first and second variable optical attenuators based on the predetermined gain and attenuation settings.

7. A method for compensating for Raman tilt in an optical signal, defined by a center wavelength, transmitted in an optical fiber link, which includes an optical amplifier, comprising the steps of:
a) tapping off a portion of the optical signal;
b) determining a measure of optical power of the optical signal, from the tapped off portion;
c) determining the Raman tilt from the measure of optical power; and
d) adjusting gain provided by the optical amplifier to compensate for the Raman tilt;
wherein the optical amplifier includes first and second controlled amplifier stages, and first and second variable optical attenuators;
wherein step d) includes adjusting gain in at least one of the first and second controlled amplifier stages, and adjusting attenuation in at least one of the first and second variable optical attenuators;
wherein the optical amplifier further comprises a Raman amplifier stage;
wherein the first and second controlled amplifier stages comprise first and second erbium doped fiber amplifiers, respectively; and
wherein step d) includes adjusting gain of at least one of the Raman amplifier stage and the first and second erbium doped fiber amplifiers, and adjusting attenuation in at least one of the first and second variable optical attenuators.

8. An optical amplifier device for compensating for Raman tilt in an optical signal, including a plurality of wavelength channels $\lambda'$, including a first wavelength $\lambda_1$, transmitted in an optical fiber link, which includes an optical amplifier, comprising:
a tap for separating a portion of the optical signal;
a splitter for separating the tapped off portion into first and one or more second sub-portions;
a first photo-detector for receiving the first sub-portion to determine the measure of optical power $P_{tot}$, proportional to the signal's optical power;
one or more optical filters with a predetermined transmission function, each optical filter for receiving one of the second sub-portions forming a filtered second sub-portion; and
one or more second photo-detectors, each second photo-detector for receiving one of the filtered second sub-portions;
a controller for determining the Raman tilt based on the measures of optical power from the first and second photo-detectors; and
an adjustable optical amplifier controlled by the controller for amplifying the optical signals to compensate for the Raman tilt;
wherein the transfer function of the one or more optical filters is proportional to the optical signal's second moment of power term $P_2$;
wherein $$P_2 = \sum_{\lambda'} P(\lambda') \cdot (\lambda' - \lambda_1)^2;$$

wherein the controller determines the Raman tilt based on the equation $T = a \times P_{tot} + 3b \times P_2$
in which a and b are predetermined based on optical fiber in the optical fiber link.

9. The device according to claim 8, wherein the optical filter substantially filters out power at the center wavelength, and gradually decreasingly less amounts of power at wavelengths on either side of the center wavelength.

10. The device according to claim 8, wherein the predetermined transmission function of the optical filter is parabola shaped, defined by: $T(\lambda) = c_2 \cdot (\lambda - \lambda_0)^2$ in which $c_2$ is a predetermined constant based on the filter, and $\lambda_0$ is the center wavelength of the optical signal.

11. The device according to claim 8, wherein the predetermined transmission function of the optical filter is inverted parabola shaped, defined by: $T(\lambda) = c_1 + c_2(\lambda - \lambda_0)^2$ in which $c_1$, $c_2$ are predetermined constants based on the filter, wherein $c_1$ is > or =0, and $c_2$ is <0 or >0, and $\lambda_0$ is the center wavelength of the optical signal.

12. The device according to claim 8, wherein the amplifier includes first and second controlled amplifier stages, and first and second variable optical attenuators;
wherein the controller adjusts gain of at least one of the first and second controlled amplifier stages, and adjusts attenuation in at least one of the first and second variable optical attenuators.

13. The device according to claim 12, wherein the controller consults a predetermined table of optical power measurements with corresponding gain and attenuation settings for the first and second controlled amplifier stages and the first and second variable optical attenuators; and sets the first and second controlled amplifier stages and the first and second variable optical attenuators based on the predetermined gain and attenuation settings.

14. A method for compensating for Raman tilt in an optical signal, defined by a center wavelength, transmitted in an optical fiber link, which includes an optical amplifier, comprising the steps of:
   a) tapping off a portion of the optical signal;
   b) determining a measure of optical power of the optical signal, from the tapped off portion;
   c) determining the Raman tilt from the measure of optical power; and
   d) adjusting gain provided by the optical amplifier to compensate for the Raman tilt;
   wherein the optical amplifier comprising a Raman amplifier stage, and first and second erbium doped fiber amplifiers stages; and
   wherein step d) includes adjusting gain of at least one of the Raman amplifier stage and the first and second erbium doped fiber amplifiers.

15. The method according to claim 14, wherein step b) includes:
   i) separating the tapped off portion into first and second sub-portions;
   ii) passing the first sub-portion to a photo-detector to determine the measure of optical power; and
   iii) passing the second sub-portion to an optical filter with a predetermined transmission function forming a filtered second sub-portion; and
   iv) passing the filtered second sub-portion to a photo-detector to determine a measure proportional to the optical signal's second moment power terms.

16. The method according to claim 15, wherein step c) includes determining the Raman tilt based on the equation $T = a \times P_{tot} + 3b \times P_2$
   in which a and b are predetermined based on the optical fiber link, $P_{tot}$ is the measure of the optical signal's optical power, and $P_2$ is the measure of the optical signal's second moment power terms.

17. An optical amplifier device for compensating for Raman tilt in an optical signal, defined by a center wavelength, transmitted in an optical fiber link, which includes an optical amplifier, comprising:
   a tap for separating a portion of the optical signal;
   a photo-detector for determining a measure of optical power from the separated portion;
   a controller for determining the Raman tilt based on the measures of optical power; and
   an adjustable optical amplifier controlled by the controller for amplifying the optical signals to compensate for the Raman tilt;
   wherein the adjustable optical amplifier includes first and second controlled amplifier stages, a Raman amplifier stage between the first and second controlled amplifier stages, and first and second variable optical attenuators;
   wherein the controller adjusts gain of at least one of the first and second controlled amplifier stages, and adjusts attenuation in at least one of the first and second variable optical attenuators;
   wherein the first and second controlled amplifier stages comprise first and second erbium doped fiber amplifiers, respectively; and
   wherein the controller adjusts gain of at least one of the Raman amplifier stage and the first and second erbium doped fiber amplifier stages to compensate for the Raman tilt.

18. An optical amplifier device for compensating for Raman tilt in an optical signal, defined by a center wavelength, transmitted in an optical fiber link, which includes an optical amplifier, comprising:
   a tap for separating a portion of the optical signal;
   a photo-detector for determining a measure of optical power from the separated portion;
   a controller for determining the Raman tilt based on the measures of optical power; and
   an adjustable optical amplifier controlled by the controller for amplifying the optical signals to compensate for the Raman tilt;
   wherein the optical amplifier comprising a Raman amplifier stage, and first and second erbium doped fiber amplifiers stages; and
   wherein the controller adjusts gain of at least one of the Raman amplifier stage and the first and second erbium doped fiber amplifiers to compensate for the Raman tilt.

19. The device according to claim 18, further comprising:
   a splitter for separating the tapped off portion into first and second sub-portions;
   a first photo-detector for receiving the first sub-portion to determine the measure of optical power, proportional to the signal's optical power;
   an optical filter with a predetermined transmission function for receiving the second sub-portion forming a filtered second sub-portion; and
   a second photo-detector for receiving the filtered second sub-portion to determine a measure proportional to the optical signal's second moment power terms.

20. The device according to claim 19, wherein the controller determines the Raman tilt based on the equation $T = a \times P_{tot} 3b \times P_2$
   in which a and b are predetermined based on optical fiber in the optical fiber link, $P_{tot}$ is the measure of the optical signal's optical power, and $P_2$ is the measure of the optical signal's second moment power terms.

* * * * *